United States Patent [19]

Vinciarelli

[11] 4,415,959
[45] Nov. 15, 1983

[54] FORWARD CONVERTER SWITCHING AT ZERO CURRENT

[75] Inventor: Patrizio Vinciarelli, Skillman, N.J.

[73] Assignee: Vicor Corporation, Westford, Mass.

[21] Appl. No.: 246,120

[22] Filed: Mar. 20, 1981

[51] Int. Cl.³ .................................. H02P 13/22
[52] U.S. Cl. .............................. 363/21; 363/131
[58] Field of Search ............... 363/20, 25, 27, 28, 363/47, 48, 62, 131, 124; 323/282, 289, 351

[56] References Cited

U.S. PATENT DOCUMENTS

| | | | |
|---|---|---|---|
| 3,119,972 | 6/1964 | Fischman | 363/27 |
| 3,259,829 | 7/1966 | Feth | 363/60 |
| 3,529,228 | 9/1970 | Cordy | 363/24 |
| 3,543,130 | 11/1970 | Reijnders | 363/28 |
| 3,582,754 | 6/1971 | Hoffmann | 363/18 |
| 3,621,362 | 11/1971 | Schwarz | 363/27 |
| 3,663,940 | 5/1972 | Schwarz | 363/28 |
| 3,953,779 | 4/1976 | Schwarz . | |
| 4,007,413 | 2/1977 | Fisher et al. | 363/22 |
| 4,017,784 | 4/1977 | Simmons et al. | 363/17 |
| 4,024,453 | 5/1977 | Corry . | |
| 4,138,715 | 2/1979 | Miller | 363/96 |
| 4,158,881 | 6/1979 | Simmons et al. | 363/97 |
| 4,318,164 | 3/1982 | Onodera et al. | 363/21 |

FOREIGN PATENT DOCUMENTS

| | | | |
|---|---|---|---|
| 2218055 | 10/1973 | Fed. Rep. of Germany | 323/268 |
| 2756799 | 6/1978 | Fed. Rep. of Germany | 363/21 |
| 2756773 | 7/1978 | Fed. Rep. of Germany | 219/10.77 |

OTHER PUBLICATIONS

Memoirs of the Faculty of Engineering, Kobe Univ., No. 22, pp. 99–111, Mar. 1976.

*Primary Examiner*—William H. Beha, Jr.

[57] ABSTRACT

A DC-to-DC converter processes power by a sequence of energy transfer cycles in each of which a quantum of energy is taken from a voltage source towards a current sink via a magnetic energy storage device (specifically a transformer having a small effective leakage inductance) and a capacitor. This (effective) LC circuit defines a characteristic time scale for the rise and fall of the current drawn from the voltage source so that a switching device connected in series with the source can be switched on and off at essentially zero current. Following each cycle the energy stored in the capacitor is released by the current sink. After the capacitor is discharged, the sink current is carried by a rectifier diode connected in parallel with the capacitor. This prevents the LC circuit from becoming a resonant circuit and leads to a unidirectional flow of energy from source to load which optimizes the efficiency and power density of the conversion process.

13 Claims, 9 Drawing Figures

FORWARD CONVERTER SWITCHING AT ZERO CURRENT

BACKGROUND OF THE INVENTION

1. Field of the Invention

This invention relates to DC-to-DC converters and more particularly to forward type, single-ended converters switching at zero current.

2. Description of the Prior Art

DC-to-DC conversion is commonly realized with converter topologies which may be classified within three families, related to the buck, boost and buck-boost switching regulators. Over the years these families have grown with the addition of new members, conceived to accomplish particular goals. However, not every goal could be accomodated. In particular, the containment of switching losses at high frequencies has proven elusive. Consequently, operation at higher frequencies, which should be beneficial from most points of view, has in the past often entailed a compromise in conversion efficiency, considerable stress on switching elements and high levels of unwanted EMI.

These limitations have often been recognized to motivate resonant conversion techniques in which electrical energy is processed via series resonant circuits. The inherent oscillation properties of these circuits enable one to turn-off switches in series with them, in phase with the vanishing of currents flowing through them. Switches can then be made to revert to a voltage blocking state virtually without energy loss. Unfortunately, inherent oscillations have additional implications which amount to serious drawbacks.

One difficulty derives from the requirement that the resonant circuit possess a high Q, an obvious prerequisite to efficient power processing by such a circuit. This requirement has signified lack of stability, in the form of "run-away" solutions, implying unbounded oscillation amplitudes with potentially catastrophic implications. In the words of F. C. Schwarz (in IEEE Power Electronics Specialists Conference, 1975 Record, pg. 194-204), protection against their insurgence "proved cumbersome and introduced added complexity in the form of added switching elements." The addition of switching elements was later circumvented by a "phase angle control" technique. However this latter approach necessitates a high degree of sophistication in its control circuitry.

In addition to the "ever present danger of runaway conditions", resonant converters have suffered from the disadvantage of requiring switches capable of blocking voltages of either polarity, such as tyristors. However tyristors are relatively slow devices, unsuitable for high frequency operation; furthermore, during conduction they exhibit a pn diode forward voltage drop leading to substantial power dissipation for low operating voltages. While high frequency operation can be achieved by resorting to bidirectional voltage blocking switches consisting, e.g., of a series connection of a fast recovery rectifier with a fast transistor, the required hardware is more complicated; and it is still power wasteful at low operating voltages where the reduction in switching losses could be offset by increased switch "saturation" losses.

Aside from the technical difficulties listed above, non-resonant conversion may be objected to on fundamental, conceptual grounds because its inherent energy exchange mechanism violates what one may call the principle of unidirectional energy flow. A conversion topology conceived to optimize efficiency and power density should attempt to incorporate this self-evident principle. Unfortunately, existing topologies which meet this criterion, such as members of the buck or boost families, inevitably suffer from switching loss problems.

SUMMARY OF THE INVENTION

This invention provides a new topology for DC-to-DC conversion. The topology is single-ended, in the sense that power flow is gated by one switching device. Power is processed via intermediate magnetic and electric energy storage. Magnetic storage is effected by exploiting the effective leakage inductance of a power transformer or by a discrete inductor. Electric storage is effected by a capacitor, thus completing a LC circuit. This is not a resonant circuit; the energy stored in the capacitor is not returned, even fractionally, to the inductor but is instead delivered to a load. The voltage amplitude across the capacitor is unipolar and bounded. Its peak value determines the quantum of energy transferred from source to load in one energy transfer cycle. The conversion process consists of a sequence of sucy cycles. The time interval between subsequent cycles may be controlled to regulate the magnitude of the ouutput voltage or current.

By switching at zero current the new approach virtually eliminates switching losses, as resonant converters do. However, in sharp contrast to resonant converters, it does so without compromising other aspects of the conversion process. In particular, the voltage amplitude across the storage capacitor is inherently bounded, and the converter is inherently stable, i.e. free from the danger of nonlinear run-away solutions. Furthermore, that same amplitude is unipolar and the storage capacitor does not resonate with the storage inductor. Consequently, energy flow within the converter is unidirectional from source to load. The absence of a back flow of energy from the storage capacitor to the storage inductor eliminates any related dissipation. Finally, the new topology lends itself to implementations involving switches capable of blocking a unipolar voltage, thus avoiding the need to form series combinations of multiple switching elements or to employ slow tyristors.

The new topology permits the processing of electric power at very high frequency with all of the attendant benefits and none of the usual drawbacks. In particular, in addition to high power density, fast transient response, ease of filtering input and output ripple, embodiments of the new converter topology exhibit very high efficiency and low levels of EMI.

The new topology provides the general conversion process, including the step-up or step-down of the input DC voltage. It also provides for isolation of the load from the source, if desired. In fact, in addition to DC isolation, it will inherently provide effective decoupling of common mode noise because of a reduction in stray primary to secondary capacitance resulting from the natural use of a leakage reactance transformer.

Other advantages of the new DC-to-DC converter topology derive from its structural simplicity, in particular its single-ended character and the possibility of employing a switch drive referred to ground, i.e. "non-floating". The control circuitry can be realized with few readily available components, with a low total component count and cost.

DETAILED DESCRIPTION OF THE INVENTION

Figure 1:
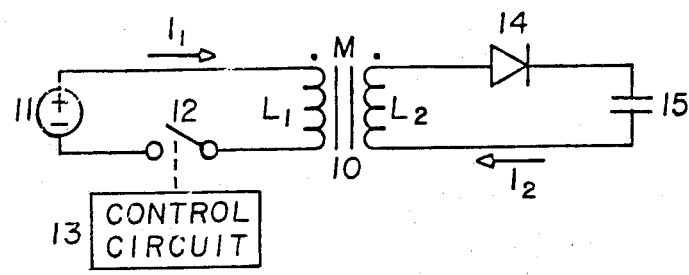
FIG. 1 discloses a forward converter switching at zero current, embodying features illustrative of the invention.

A single-ended converter circuit is disclosed in FIG. 1. The circuit is designed to efficiently transfer energy from a voltage source to charge a capacitor. The capacitor is coupled to the source via a transformer. In addition to providing isolation and voltage multiplication, this transformer serves to provide a medium for magnetic energy storage, which plays a central role in the conversion process. For this purpose the transformer is especially constructed to exhibit a desired value of effective leakage reactance between its primary and secondary windings.

Figure 2:
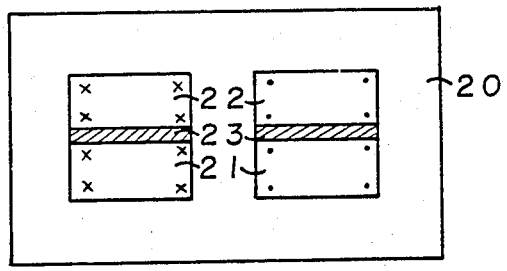
FIG. 2 schematically shows a transformer construction suitable to incorporate a small effective leakage inductance, following one principle of the invention.

The embodiment of a transformer construction suitable for achieving a controlled leakage inductance is shown in cross-section in FIG. 2. The transformer windings are wound around the center post of a ferrite pot core 20. The primary winding 21 is separated from the secondary winding 22 by a dielectric spacer 23, whose thickness controls the degree of magnetic coupling between the windings. A simple and useful example of this type of construction is obtained by employing separate sections of a double-section bobbin to wind the primary and secondary windings. The transformer is then easily assembled by enclosing the bobbin within a magnetic core.

Assuming that the windings have negligible resistance and parasitic capacitance, such a linear transformer is characterized by three parameters which may be identified with the self-inductance of the primary winding $L_1$, the self-inductance of the secondary winding $L_2$, and their mutual inductance $M$. These parameters appear as coefficients of a coupled system of two linear first order differential equations, which relate time derivatives of the primary and secondary current to primary and secondary voltages. By a procedure familiar to those skilled in the art, this differential system can be reduced to a single differential equation which is referred either to the primary or the secondary of the transformer. When referred to the secondary, this equation determines the secondary current as the current flowing through a fictitious inductor of inductance $L_{2e}=(L_1L_2-M^2)/L_1$ subject to an instantaneous voltage given by the difference between the transformed source voltage $((M/L_1) \times$ primary voltage$)$ and the secondary voltage. The inductance $L_{2e}$ is referred to as effective secondary leakage inductance. For the proper operation of converters following the principles of this invention, the effective secondary leakage inductance $L_{2e}$ should have a value which, though different from zero, must be small relative to the self-inductance of the secondary winding $L_2$, $L_{2e}<L_2$. This condition may be reexpressed in terms of the magnetic coupling coefficient $k$, defined as $k=M/\sqrt{L_1L_2}$, by noting that $L_{2e}=(1-k^2)L_2$. The condition therefore implies that $k$ should approach one.

Referring now to FIG. 1, the power transformer 10 has a primary winding of self-inductance $L_1$ and a secondary winding of self-inductance $L_2$. The mutual inductance between primary and secondary windings is $M$. Following standard notations, the relative polarity of the two windings is denoted by dots. The primary winding is coupled to a voltage source 11 of voltage $V_{in}$ by a switching device 12. The state of the switching device 12 is determined by control means 13. A unidirectional conducting device 14, such as a rectifier diode, is connected in series with the secondary winding. The device 14 is connected with an appropriate polarity: it is oriented to conduct a current when the switching device 12 is conducting a current. A capacitor 15 of capacitance C is connected in series with the secondary winding and the unidirectional conducting device 14.

The polarity arrangement described above is typical of the "forward" converter and contrasts with that of the "flyback". On the other hand, incorporation of magnetic energy storage in the power transformer is reminiscent of the flyback. However, the flyback topology is based upon the storage of a relatively large amount of energy in an air gap, as opposed to a relatively small amount of energy in the primary to secondary leakage inductance. In fact, with both forward and flyback converters an attempt is usually made to minimize stray leakage inductance since this can entail substantial switching losses in either of those converting topologies. It is amusing to note that, following one of the principles of this invention, a satisfactory resolution to the problem of eliminating switching losses is found by exploiting a controlled amount of leakage inductance.

The impossibility of eliminating switching losses in converters based on the forward and flyback topologies may be attributed to the absence of a characteristic time scale or energy scale within these topologies. The absence of a characteristic energy quantum is of course beneficial in one respect in that it leads to Pulse Width Modulation as an effective voltage regulation technique. However, that same feature implies that once the process of transferring energy from source to load is initiated it will not arrest itself and to arrest it entails switching losses, since switching devices must be forced to revert to a voltage blocking mode while conducting a current. The introduction of a characteristic time scale and the ensuing energy quantization enables one to circumvent this difficulty since the energy transfer process will then automatically arrest itself immediately after the transfer of one quantum of energy. The conversion process thus naturally becomes a sequence of energy transfer cycles.

A characteristic time scale is present in the converter topology disclosed in FIG. 1. It is defined in terms of the secondary leakage inductance $L_{2e}=(L_1L_2-M^2)/L_1$ of the power transformer 10 and the capacitance C of capacitor 15 by $T/2 = \pi\sqrt{L_{2e}C}$. This is the half-period of the effective LC circuit which results from the combination of the capacitor 15 with a fictitious inductor, of inductance $L_{2e}$, effectively contained within the power transformer 10.

In light of these observations the operation of the circuit disclosed in FIG. 1 is simply explained. Assuming that at time $t=0$ the control means 13 closes the switching device 12 setting it in a conducting mode, voltage $V_{in}$ from the source 11 is then applied across the primary of the power transformer 10. Assuming that the voltage $V_C$ across the capacitor 15 at time $t=0$ is less than the transformed primary voltage, $V_{in} \cdot M/L_1$, the unidirectional conducting device 14 is then forward biased, thus initiating conduction of a current $I_2$ charging the capacitor 15. Because of the effective secondary leakage inductance, this charging current $I_2$ has a finite rise and fall time. The charging cycle ends when conduction by the unidirectional conducting device 14 ceases as it becomes reverse biased. During the charging cycle the primary current $I_1$ from the voltage source 11 rises and falls substantially in synchronism with the secondary current $I_2$, provided that $L_{2e} << L_2$, in accordance with one of the principles of this invention. The condition $L_{2e} << L_2$ implies that at the end of the charging cycle, i.e. when the secondary current $I_2$ vanishes, the primary current $I_1$ is negligibly small. The switching device 12 is then reset in a blocking mode by control means 13. Since both the closing and opening of the switching device 12 are executed when the current $I_1$ through the device is negligibly small, losses usually associated with finite voltage rise and fall times of the non-ideal hardware realization of the switching device are eliminated, as long as these characteristic times are small relative to the characteristic time scale $T/2$ of the conversion cycle. Thus a quantum of energy is efficiently transferred from the voltage source 11 via the effective leakage inductance of transformer 10 to charge the capacitor 15.

A more detailed analysis of the conversion cycle is arrived at with a mathematical procedure familiar to those skilled in the art by solving the linear first order system $$V_{in} = L_1 \dot{I}_1 - M \dot{I}_2 \qquad \text{Eq. (1)}$$

$$V_c = -L_2 \dot{I}_2 + M \dot{I}_1, \qquad \text{Eq. (2)}$$

defined by the idealized circuit in FIG. 1 when the devices 12 and 14 are conducting. Following standard conventions, here a dot denotes a first derivative with respect to time. By substitution, the system of Eqs. (1) and (2) leads to the equation:

$$L_{2e} \dot{I}_2 = V_{in} M/L_1 - V_c, \qquad \text{Eq. (3)}$$

where $L_{2e}$ is the effective secondary leakage inductance previously defined in terms of $L_1$, $L_2$ and M. Assuming as a possible example of an initial condition that the capacitor 15 is initially discharged, i.e. $V_c(t=0)=0$, Eq. (3) is readily solved by $$I_2(t) = \frac{2\pi}{T} C V_{in} \frac{M}{L_1} \sin\left(\frac{2\pi}{T} t\right), \qquad \text{Eq. (4)}$$

$$V_c(t) = V_{in} \frac{M}{L_1} \left(1 - \cos\left(\frac{2\pi}{T} t\right)\right), \qquad \text{Eq. (5)}$$

in the time interval $0 \leq t \leq T/2$, to which Eqs. (1) and (2) apply. Substituting Eq. (4) into Eq. (1) yields:

$$I_1(t) = \frac{V_{in}}{L_1} t + \frac{M}{L_1} I_2(t). \qquad \text{Eq. (6)}$$

Figure 3:
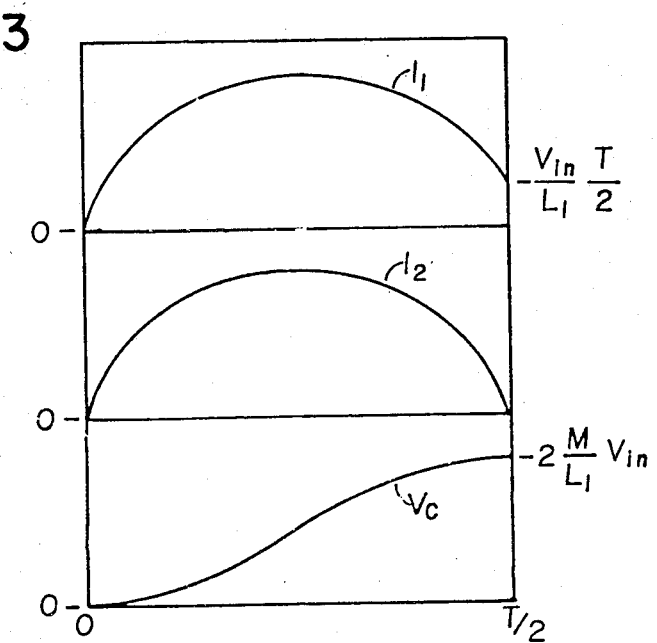
FIG. 3 discloses current and voltage waveforms useful in describing the operation of the converter circuit schematically shown in FIG. 1.

This explicit solution of the conversion cycle, including the primary current $I_1(t)$ and secondary current $I_2(t)$ of transformer 10 and the voltage $V_C(t)$ across capacitor 15, is represented graphically in FIG. 3. In the cycle, the sinusoidal secondary current $I_2$ is seen to charge the capacitor 15 from zero to twice the transformed source voltage, $2V_{in}M/L_1$. Thus the quantum of energy E transferred from the voltage source 11 to the capacitor 15 within the cycle is:

$$E = \tfrac{1}{2} C(2V_{in}M/L_1)^2. \qquad \text{Eq. (7)}$$

At the end of the cycle, $t = T/2$, the secondary current vanishes but the primary current $I_1$ is different from zero, $$I_1\left(\frac{T}{2}\right) = \frac{V_{in}}{L_1} \cdot \frac{T}{2} = \frac{V_{in}}{L_1} \pi \sqrt{L_{2e}C}, \qquad \text{Eq. (8)}$$

because, as indicated by Eq. (6), the primary current contains a linearly rising component in addition to the sinusoidal component associated with the secondary current. The residual primary current given by Eq. (8) implies that a residual energy $E_r$ $$E_r = \tfrac{1}{2} L_1 I_1^2 = \tfrac{1}{2} C (\pi V_{in} \sqrt{L_{2e}/L_1})^2 \qquad \text{Eq. (9)}$$

is stored in the transformer 10 at the end of the cycle. Unless this residual energy $E_r$ is recycled, it must be disposed of at the end of the cycle by dissipation either within the non-ideal hardware realization of the switching device 12 or by a suitable "snubber" network. In this case, the efficiency of the conversion process demands that the residual energy $E_r$ given by Eq. (9) be small relative to the quantum of energy transferred, E, given by Eq. (7). The ratio of these two quantities is $$\frac{E_r}{E} = \left(\frac{\pi}{2}\right)^2 \frac{L_1 L_2 - M^2}{M^2} = \left(\frac{\pi}{2}\right)^2 \frac{1 - k^2}{k^2} \qquad \text{Eq. (10)}$$

and is therefore determined by the magnetic coupling coefficient k. The efficiency requirement then translates into the condition that k approach 1, i.e. that the transformer be closely coupled. This condition in turn suggests that the conversion process operate at high frequencies since the duration of a conversion cycle $$\frac{T}{2} = \pi \sqrt{L_{2e}C} = \pi \sqrt{L_2 C} \sqrt{1 - k^2} \qquad \text{Eq. (11)}$$

becomes smaller as the coupling coefficient k approaches one.

An experimental verification of the converter circuit disclosed in FIG. 1 was performed with a power transformer 10 constructed as in FIG. 2. The magnetic core 20 was a 1408 pot core in W ferrite material manufactured by Magnetics Inc.. The primary winding 21 and secondary winding 22 were wound on separate sections of a double-section bobbin (Magnetics B1408-02), so that the dielectric spacer 23 was simply provided by the bobbin itself. The primary and secondary windings consisted of 10 and 5 turns respectively of Litz wire of such a cross-section that both sections of the bobbin were full. With this transformer, the converter circuit of FIG. 10 was operated with a voltage source 11 of voltage $V_{in} = 40$ Volts, to charge a polypropilene film capacitor 15 of capacitance $C = 0.22 \times 10^{-6} F$. The capacitor 15 was charged from zero to 40 Volts in approximately $10^{-6}$ sec. The quantum of energy E, Eq. (7), transferred from the voltage source 11 to the capacitor 15 amounted to approximately $180 \times 10^{-6}$ Joule. The residual energy $E_r$, Eq. (9), dissipated in the switching device 12 was approximately $1 \times 10^{-6}$ Joule. Consequently the inefficiency represented by the dissipation of the residual energy, Eq. (10), amounted to less than 1%. The actual efficiency of the energy transfer cycle was in fact affected mainly by the conduction losses of the unidirectional conducting device 14, a Schottky rectifier, and the switching device 12, a power transistor. As expected, in spite of the short duration, $10^{-6}$ sec, of the cycle, switching losses were negligible thanks to the approximate vanishing of primary and secondary currents during voltage transitions across devices 12 and 14.

Figure 8:
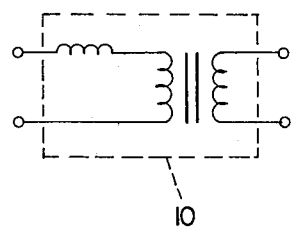
FIGS. 8 and 9 disclose discrete inductors connected in series with the primary and secondary windings, respectively, of the transformer.
Figure 9:
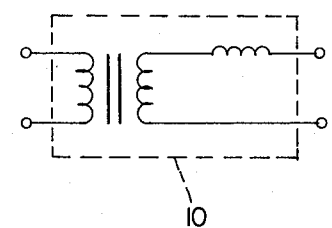

In summary, the new single-ended converter topology, as idealized in FIG. 1, provides for fast and efficient transfer of electrical energy from a voltage source 11 to a capacitor 15, isolated from the source by a power transformer 10, constructed to exhibit a small effective leakage inductance for intermediate energy storage. Depending on the turns ratio between the windings of transformer 10, the capacitor 15 can be charged to any desired voltage from a given voltage source 11. Needless to say, these advantages are retained by converters which may be obtained from that of FIG. 1 by some obvious modifications which preserve the topology disclosed in FIG. 1. An example of such an obvious modification would be the addition of a discrete inductor connected in series with the primary or the secondary winding of transformer 10, as is shown in FIGS. 8 and 9. The inductance of such an inductor would then complement the effective leakage inductance of transformer 10 to extend the duration of the energy transfer cycle.

Energy stored in the capacitor 15 can be transferred to a load without disrupting the energy transfer process from the voltage source 11 to the capacitor 15. One possible approach is to draw energy from the capacitor 15 only during time intervals for which the previously described energy transfer process is not operational. However this would require a secondary switching device which, aside from added circuit complexity, would entail additional energy losses. A more promising approach consists of drawing energy from the capacitor 15 even during the course of energy transfer cycles from the source 11, but in such a way that the basic features of the conversion process are not disrupted. This is achieved by the converter circuit disclosed in FIG. 4.

Figure 4:
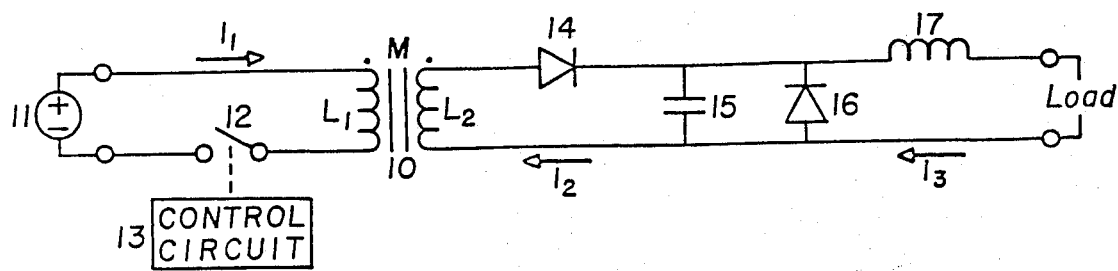
FIG. 4 discloses a preferred embodiment of the invention.

The converter circuit in FIG. 4 differs from that of FIG. 1 by the addition of two circuit elements; a second unipolar conducting device 16, such as rectifier diode, is connected in parallel with capacitor 15; an inductor 17 is connected in series between the capacitor 15 and a load. As indicated by FIG. 4, the polarity of the device 16 is such as to prevent the capacitor 15 from becoming negatively charged, except for a small voltage due to the forward voltage drop of non-ideal hardware realizations of the device 16. The inductance L of the inductor 17 is large relative to the effective secondary leakage inductance $L_{2e}$ of the power transformer 10.

The relatively large value of the inductance L, $L >> L_{2e}$, implies that, within the characteristic time scale of the energy transfer cycle, the current $I_3$ flowing through the inductor 17 may be regarded as essentially constant. Consequently, the effect of the inductor 17 and the load on the conversion process under steady state conditions can be approximately modeled in terms of a "sink" of current $I_3$. The following analysis will show that such a constant current sink does not disrupt relevant features of the previously described process of transferring energy from the source 11 to the capacitor 15 as long as the current $I_3$ does not exceed a maximum current $I_{max}$, which is a function of circuit parameters. The analysis will show that as the current $I_3$ is varied from zero towards $I_{max}$, the duration of the energy transfer cycle extends from its minimum value T/2, where again $T/2 = \pi \sqrt{L_{2e} C}$. Even though the characteristic time scale of the energy transfer cycle is retained, its actual duration is now a slowly varying function of the load current $I_3$. Similarly, even though the characteristic energy scale of the energy transfer cycle is retained and consequently the energy is in a sense still quantized, the actual quantum of energy is now also a slowly varying function of the load current. Other features of the conversion process are totally undisturbed by the presence of the sink of current $I_3$. In particular, the primary current $I_1$ and secondary current $I_2$ of the power transformer 10 will still exhibit finite rise and fall times; the transitions between conducting mode and blocking mode for the switching device 12 and the unidirectional conducting device 14 will still occur in correspondence of approximately vanishing currents $I_1$ and $I_2$; the energy flow will still be unidirectional from the source 11 to the effective leakage inductance within the power transformer 10, to the capacitor 15 and on to the load without any wasteful back flow; etc.

A qualitative analysis of the operation of the converter disclosed in FIG. 4 under steady state conditions will be illustrated with reference to FIG. 5. This figure exhibits relevant voltage and current waveforms as well as the state of switching and unidirectional conducting devices as functions of time. Specifically, FIG. 5a illustrates the state of the switching device 12 and of the unidirectional conducting device 14 distinguishing between an "on" state in which the devices are in a conducting mode an "off" state in which the devices are in a blocking mode; FIG. 5b displays the on and off states of the unidirectional conducting device 16. The secondary current waveform, $I_2(t)$, is sketched in FIG. 5c; the voltage $V_C(t)$ across capacitor 15 is sketched in FIG. 5d.

The analysis begins at time $t_1$ when the control circuit 13 closes the switching device 12 setting it in a conducting mode. Voltage $V_{in}$ is then applied across the primary winding of the power transformer 10. The induced voltage across the secondary winding of transformer 10 forward biases the unidirectional conducting device 14 and the device begins to conduct a current $I_2(t)$. Because of the effective leakage inductance of transformer 10, this current $I_2(t)$, as well as the primary current $I_1(t)$, has a finite rise time. In the following time interval between $t_1$ and $t_2$, the rise of $I_2$ is linear, as sketched in FIG. 5c. In this interval, the voltage $V_C(t)$ across capacitor 15 remains zero (see FIG. 5d) as the unidirectional conducting device 16 remains forward biased and conducts a current equal to the difference between the sink current $I_3$ and the secondary current $I_2$.

At time $t_2$ the secondary current equals the sink current. Then the device 16 smoothly becomes reverse biased and reverts to a blocking mode, as indicated in FIG. 5b. In the following interval between $t_2$ and $t_3$, the rise of the secondary current continues, but at a decreasing rate as the difference $I_2$-$I_3$ begins to charge the capacitor 15 to a positive voltage $V_C(t)$ as sketched in FIG. 5d.

At time $t_3$ the voltage $V_C$ equals the transformed source voltage $V_{in}M/L_1$. At this time the secondary current reaches its peak value. In terms of an equivalent model, this is the time when the voltage across the effective leakage inductance changes sign. In the following time interval between $t_3$ and $t_4$, the voltage $V_{C(t)}$ across the capacitor 15 continues to rise but at a decreasing rate, as the secondary current begins to fall.

At time $t_4$ the secondary current $I_2$ becomes smaller than the sink current $I_3$. At this time the voltage $V_C(t)$ reaches its peak value $2V_{in}\cdot M/L_1$. In the following time interval between $t_4$ and $t_5$, the voltage $V_C(t)$ begins to fall, as the secondary current $I_2$ decreases at a faster rate.

At time $t_5$ the secondary current $I_2$ vanishes. This signals the end of the energy transfer cycle. The unidirectional conducting device 14 reverts to a blocking mode, while the switching device 12 is opened, i.e. reset into a blocking mode by the control curcuit 13. These transitions are indicated in FIG. 5a. In the following time interval, between $t_5$ and $t_6$, the sink current $I_3$ discharges the capacitor 15. The voltage $V_C(t)$ is sketched in FIG. 5d.

At time $t_6$ the voltage $V_C$ vanishes. Then, as indicated in FIG. 5b, the unidirectional conducting device 16 becomes forward biased and begins to conduct the sink current $I_3$. In the following time interval, between $t_6$ and $t_7$, the sink current is conducted by the device 16, as the capacitor 15 remains discharged.

At time $t_7$ a new energy transfer cycle is initiated.

A quantitative analysis of the operation of the converter disclosed in FIG. 4 under steady state conditions is easily carried out in the approximation of a constant current sink ($I_3$=constant), which, as already argued, is justified by one of the principles of the invention. In the time interval $t_1$-$t_2$, characterized by the voltage $V_C(t)$ across capacitor 15 remaining zero, Eq. (3) yields the secondary current $$I_2(t) = t\cdot V_{in}\cdot M/(L_1\cdot L_{2e}), \quad t_1 \leq t \leq t_2, \qquad \text{Eq. (12)}$$

which rises linearly as indicated in FIG. 5c. The interval ends when the secondary current $I_2(t)$ exceeds the sink current $I_3$. The duration of this time interval is therefore, $$t_2 - t_1 = I_3 \cdot L_1 \cdot L_{2e}/(MV_{in}), \qquad \text{Eq. (13)}$$

proportional to the sink current $I_3$.

From time $t_2$ to time $t_5$ the secondary current $I_2(t)$ is again determined by Eq. (3), where $$V_C(t) = \frac{1}{C} \int_{t_2}^{t} dt\, (I_2(t) - I_3). \qquad \text{Eq. (14)}$$

In the approximation of a constant current sink, the solution is $$I_2(t) = I_3 + \frac{2\pi}{T} C V_{in} \frac{M}{L_1} \sin\left(\frac{2\pi}{T}(t - t_2)\right). \qquad \text{Eq. (15)}$$

Substitution of Eq. (15) into Eq. (14) yields an explicit expression for the voltage $V_C(t)$:

$$V_C(t) = V_{in}\frac{M}{L_1}\left(1 - \cos\left(\frac{2\pi}{T}(t - t_2)\right)\right). \qquad \text{Eq. (16)}$$

The behavior of $I_2(t)$ and $V_C(t)$, given by Eqs. (15) and (16), is exhibited by the waveforms in FIG. 5c,d. As indicated by this figure, time $t_5$ is characterized by the vanishing of the secondary current $I_2(t)$. The duration of the time interval between $t_2$ and $t_5$ is therefore:

$$t_5 - t_2 = \frac{T}{2\pi} \arcsin\left(\frac{-I_3 T L_1}{2\pi C V_{in} M}\right). \qquad \text{Eq. (17)}$$

This expression is meaningful as long as the sink current $I_3$ does not exceed a maximum current $I_{max}$, $$I_{max} = \frac{2\pi C V_{in} M}{T L_1}. \qquad \text{Eq. (18)}$$

If the sink current $I_3$ were to exceed $I_{max}$, the secondary current $I_2(t)$, given by Eq. (15), would not vanish. This would disrupt relevant features of the conversion process. From Eq. (17), the minimum and maximum values of the time interval ($t_5 - t_2$) are seen to be $T/2$ and $3T/2$, corresponding to $I_3=0$ and $I_3=I_{max}$, respectively.

An experimental verification of the converter circuit disclosed in FIG. 4 was performed with the same components previously used to test the circuit of FIG. 1. The additional elements 16 and 17 were respectively a Schottky rectifier and a 30 microhenry inductor, assembled in an air-gapped ferrite pot core. As expected, this inductance value was found to be large enough to justify the constant current sink approximation used in the previous mathematical analysis. The waveforms reported in FIG. 5 were accurately recovered.

At this point it may be useful to elaborate further on the role played by some elements in the circuit of FIG. 4, in particular the capacitor 15, the unidirectional conducting device 16, and the transformer 10.

If the capacitor 15 were to be omitted from the circuit of FIG. 4, one would recover the topology of a forward converter. The transformer 10 would then be designed to minimize effective leakage inductance ($M \to \sqrt{L_1 L_2}$) which, instead of being needed, would have undesirable consequences. The construction of the transformer would be more complicated and expensive. The nature of the conversion process would be dramatically different. The transition from conducting mode to blocking mode and vice versa for the devices 12, 14 and 16 would no longer occur at essentially vanishing currents, leading to switching losses and reduced efficiency, stress on the devices and reduced reliability, EMI etc. This would make it impossible to reap the many substantial benefits of higher operating frequencies.

Capacitor 15, in combination with the effective leakage inductance of transformer 10, in one stroke virtually eliminates all of those problems, making it possible to take full advantage of much higher operating frequencies. The action of capacitor 15, in combination with the effective leakage inductance of transformer 10, is simply explained by referring back to the forward converter. The high frequency impedance of the effective leakage inductance lenghtens the rise time of voltage and current waveforms eliminating turnon switching losses, at the beginning of the energy transfer cycle. Without the capacitor 15, this would be achieved at the expense of increased turn-off switching losses, as the amount of energy stored in the effective leakage inductance would grow with time. The charging of capacitor 15 above the transformed source voltage, $V_{in}M/L_1$, releases the energy previously stored in the effective leakage inductance, eliminating it as an inertia to the termination of the energy transfer cycle. As reflected by FIG. 5, the combined effect is a smoothing of current and voltage waveforms both at turn-on and turn-off, with all the attendant benefits.

In certain applications, capacitor 15 will experience large ripple currents. This poses the problem of losses associated with the equivalent series resistance (ESR) of the capacitor, which would not be present in a forward converter. Thanks to the high operating frequencies, these losses may be kept negligible by a proper (and inexpensive) choice of capacitor type. A possible choice is that of polypropilene or other film with very low high frequency dissipation factor in an extended foil construction. At frequencies of the order of several hundred kilohertz, the needed capacitance is small enough so that the size and cost of such a capacitor, in the scale set by the converter as a whole, are insignificant. Yet such a capacitor will exhibit ESR values as low as a few milliohms.

With capacitor 15 in place, one might be tempted to remove the unidirectional conducting device 16 from the circuit of FIG. 4. Its removal would compromise several important features of the conversion process.

First of all the omission of the device 16 would allow the capacitor 15 to become negatively charged. In the example of FIG. 5, this would happen following time $t_6$. The energy required to negatively charge capacitor 15 would then be drawn from energy previously stored in the inductor 17. This would imply a back flow of energy from the inductor 17 to the capacitor 15. An additional back flow of energy would occur later as a new energy transfer cycle is initiated. In fact, during an initial phase of the cycle, characterized by the voltage $V_C(t)$ being negative, energy stored in the capacitor 15 would flow back to be stored in the effective leakage inductance of transformer 10. This double back flow would compromise the unidirectional energy flow of the converter represented in FIG. 4, and would represent a manifestly inefficient approach to power processing.

Secondly, if the device 16 were to be removed, the voltage $V_C(t)$ across the capacitor 15 would fluctuate within a wider range. Thus a larger inductance L would be required for inductor 17 to maintain the ripple component of the load current $I_3$ within specified limits.

Thirdly, the omission of the device 16 would destroy an important property of the converter represented in FIG. 4, the fact that the voltage $V_C(t)$ is "a priori" bounded between zero and twice the transformed source voltage, $2 V_{in}M/L_1$. If $V_C(t)$ is allowed to go negative, its peak positive value is no longer limited, as the capacitor 15 would then resonate with the effective leakage inductance of transformer 10. This would open up the possibility of run-away solutions and pose serious stability problems.

For these reasons the unidirectional conducting device 16 plays an important role in the new conversion topology.

Equally important is the role of the transformer 10, with its multiplicity of functions, including isolation, voltage multiplication and provision for magnetic energy storage by its leakage inductance. Among these, however, only the ability to provide for magnetic energy storage is central to the new conversion topology, since isolation and voltage multiplication may be regarded as subsidiary functions. By substituting to the transformer 10 a simpler example of a magnetic energy storage device, an inductor, those peripheral functions may be separated without disrupting the main structural properties of the new topology.

Figure 6:
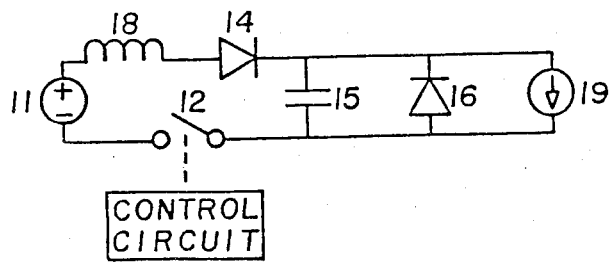
FIG. 6 discloses an equivalent circuit diagram of a portion of the embodiment of FIG. 4.

The converter in FIG. 6 is abstracted from that of FIG. 4 by such a substitution. The inductor 18 replaces the transformer 10 as a magnetic energy storage device. To further abstract from the converter of FIG. 4, the effect of inductor 17 and the load are represented in FIG. 6 by a current sink 19. The unidirectional conducting device 14 and the switching device 12 could be combined in a switching device capable of blocking voltages of either polarity.

The operation of the converter in FIG. 6 is strictly analogous to that of the converter in FIG. 4. In fact, by setting the inductance of inductor 18 equal to the effective secondary leakage inductance of transformer 10, $L_{2e}$, and the voltage of the source 11 in FIG. 6 equal to $V_{in}M/L_1$, the circuit in FIG. 6 could be regarded as an equivalent circuit representing the secondary side of the converter of FIG. 4. Thus the waveforms of FIG. 5 are also applicable to the converter of FIG. 6.

The converter idealized in FIG. 6 can be employed as a switching regulator capable of "stepping-down" the voltage from the source 11 to obtain a controlled output voltage of lower magnitude. By shifting the switching device 12, the unidirectional conducting device 14 and the inductor 18 within the input loop, it is clearly possible to arrange for either the positive or the negative output terminal to be common with the corresponding terminal of the voltage source 11. However, to provide for the most general conversion functions, including voltage inversion, voltage step-up and input-output isolation, it is necessary to refer back to the converter of FIG. 4.

The converter in FIG. 4 can provide a regulated output voltage by a straight forward application of control mechanisms familiar to those skilled in the art. Not every approach to voltage regulation is however applicable. In particular, because of the inherent approximate quantization of the energy transferred in one cycle, the new topology does not lend itself to control techniques based on Pulse Width Modulation. With the duration of an energy transfer cycle approximately quantized, the control variable must then be the time interval between cycles. This interval can be made a continuous variable or a discrete variable, i.e. an integer multiple of a fixed time interval.

With either choice, the control circuit 13 senses the voltage across the load. Under steady state conditions and assuming ideal circuit elements, the time average of the voltage across inductor 17 vanishes and therefore the voltage across the load is equal to the average over time of the voltage across capacitor 15, $V_C(t)$. When restricted to an energy transfer cycle, such as the time interval between $t_1$ and $t_5$ in FIG. 5, this average is equal to the transformed source voltage:

$$\frac{1}{t_5 - t_1} \int_{t_1}^{t_5} dt\, V_C(t) = V_{in}\frac{M}{L_1}. \qquad \text{Eq. (19)}$$

Figure 5:
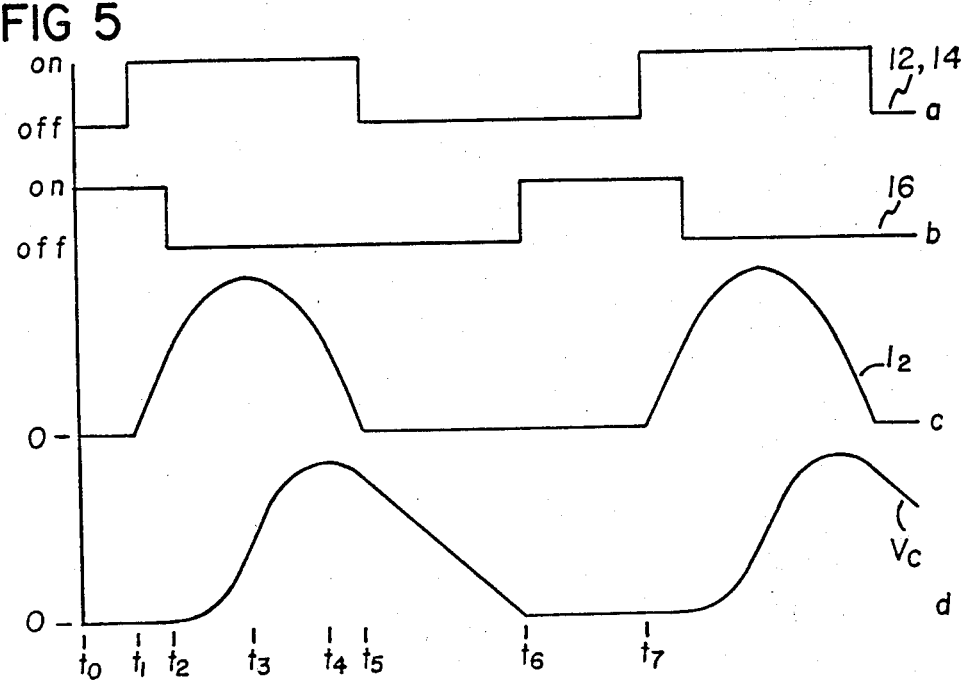
FIG. 5 discloses waveforms useful in describing the operation of the converter circuit schematically shown in FIG. 4.

When restricted to a complementary time interval, such as the interval between $t_5$ and $t_7$ in FIG. 5, the time average of $V_C(t)$ is less than the transformed source voltage, $V_{in}M/L_1$, and approaches zero as the interval is increased. The transformed source voltage, $V_{in}M/L_1$, is therefore the maximum voltage which can in principle be sustained across the load. Lower voltages are obtained by spacing energy transfer cycles further apart.

The control circuit 13 can be made to generate via a feedback loop a time interval which is continuously variable in response to the load to maintain a constant voltage across the load. With a fixed load the control circuit 13 will then initiate conduction by the switching device 12 periodically at times separated by that time interval. Under steady state conditions, this approach to voltage regulation leads to an optimal distribution of energy transfer cycles, each cycle being equally spaced from a neighboring cycle. This minimizes the ripple voltage across the load.

Alternatively, the control circuit 13 can incorporate a clock of fixed frequency and initiate conduction by the switching device 12 at times separated by a variable multiple integer of the clock's period, to maintain a constant voltage across the load. Since energy transfer cycles are not equally spaced from neighboring cycles, simple implementations of this approach exhibit higher ripple voltages as counterpart to a faster transient response.

Figure 7:
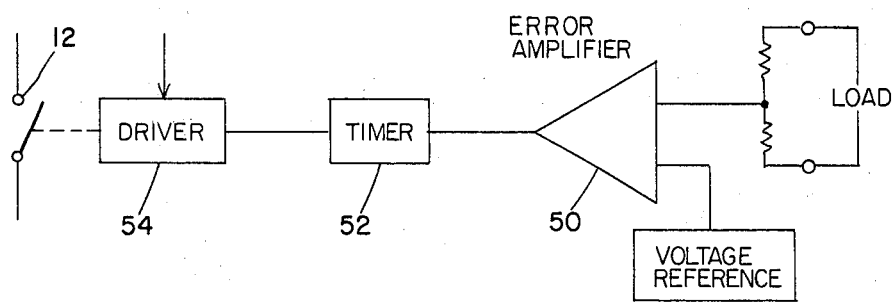
FIG. 7 discloses an example of a control circuit useful to control the switching.

These and other modes of operation of the converter represented as FIG. 4 will be obvious to those skilled in the art. It will be equally obvious that, for any given mode, the control circuit 13 can be implemented in an infinite number of ways. For example, as shown in FIG. 7, error amplifier 50 monitors the voltage across the load by comparing it to a reference voltage. The output of amplifier 50 controls timer 52 which, through driver 54, causes switch 12 to open and close as desired.

What is claimed is:

1. A single-ended, zero current switching forward converter circuit comprising:
   a voltage source;
   a power transformer including a primary winding and a secondary winding, said power transformer being constructed to have an effective secondary leakage inductance $L_{2e}$;
   a switching device to selectively couple said voltage source across the primary winding of said power transformer;
   a first unidirectional conducting device connected in series with said secondary winding and oriented to conduct during conduction by said switching device;
   a capacitor of capacitance C connected in series with said secondary winding and said unidirectional conducting device;
   control means for selectively closing and opening said switching device to transfer energy from said voltage source via the effective leakage inductance of said transformer to charge said capacitance during an energy transfer cycle having a characteristic time scale of $\pi\sqrt{L_{2e}C}$.

2. The converter circuit of claim 1 wherein said control means is further adapted for opening said switching device in response to cessation of conduction by said fist unidirectional conducting device.

3. The converter circuit of claim 1 wherein the primary and secondary windings of said transformer are wound on a common magnetic core, the secondary winding being separated from the primary winding by a dielectric spacer whose thickness is set to yield a desired value for the effective secondary leakage inductance $L_{2e}$ of said transformer.

4. The converter circuit of claim 1 further adapted to accept a load and further comprising an inductor connected in series between said capacitance and the load to deliver current to the load.

5. The converter circuit of claim 4 further comprising a second unidirectional conducting device connected in parallel with said capacitance and oriented to avoid voltage reversal across said capacitance, to periodically deliver current to the load after said capacitance is discharged.

6. The converter of claim 5 wherein said control means includes sensory means for sensing the voltage across the load, wherein said control means operating in response to said sensing means maintains a substantially constant voltage across the load by varying the time during which current delivered to the load is conducted by said second unidirectional conducting device.

7. The converter circuit of claim 6 wherein said control means initiates conduction by said switching device periodically at times separated by a continuously variable time interval dependent upon the load.

8. The converter circuit of claim 6 wherein said control means initiates conduction by said switching device at times separated by a variable integer multiple of a fixed time interval in response to the load.

9. The converter circuit of claim 7 wherein said control means terminates conduction by said switching device in response to cessation of conduction by said first unidirectional conducting device.

10. The converter circuit of claim 9 wherein the primary and secondary windings of said transformer are wound on a common magnetic core, the primary winding being separated from the secondary winding by a dielectric spacer whose thickness is set to yield a desired value for the effective secondary leakage inductance $L_{2e}$ of said transformer.

11. The converter circuit of claim 9 wherein said power transformer, incorporates an auxiliary discrete inductor to yield a desired value for the effective secondary leakage inductance $L_{2e}$ of said transformer.

12. The converter circuit of claim 11 wherein said auxiliary inductor is connected in series with the primary winding of said transformer.

13. The converter circuit of claim 11 wherein said auxiliary inductor is connected in series with the secondary winding of said transformer.

* * * * *